(12) United States Patent
Samadpour

(10) Patent No.: US 8,597,713 B2
(45) Date of Patent: Dec. 3, 2013

(54) METHOD FOR PRODUCING HYPOALLERGENIC PEANUT PRODUCTS

(76) Inventor: Mansour Samadpour, Lake Forest Park, WA (US)

(*) Notice: Subject to any disclaimer, the term of this patent is extended or adjusted under 35 U.S.C. 154(b) by 165 days.

(21) Appl. No.: 13/185,481

(22) Filed: Jul. 18, 2011

(65) Prior Publication Data

US 2013/0022718 A1 Jan. 24, 2013

(51) Int. Cl.
*A23L 1/38* (2006.01)
(52) U.S. Cl.
USPC ........... 426/634; 426/632; 426/506; 426/507; 426/508; 426/520
(58) Field of Classification Search
USPC .................. 426/632, 634, 506, 507, 508, 520
See application file for complete search history.

(56) References Cited

U.S. PATENT DOCUMENTS 7,022,369 B1* 4/2006 Kleinman ............ 426/634
2010/0143568 A1* 6/2010 Quail et al. ........... 426/615

OTHER PUBLICATIONS

Hu, Chunqiu et al. 149:77640. "Changes of peanut allergens during processing" (abstract only). Shipin Kexue (Beijing,China) (2006, 27(12), 784-788 (CODEN;SPKHD5; ISSN; 1002-6630.*

* cited by examiner

*Primary Examiner* — Helen F Heggestad

(57) ABSTRACT

A peanut food product with reduced levels of allergenic protein Ala h1 is produced by initiating the germination process in raw peanuts, holding the peanuts in moist conditions for a period of time, typically something like 48 hours, roasting the peanuts, and then performing an assay for Ala h1 to verify that a reduced level has been achieved.

1 Claim, 1 Drawing Sheet

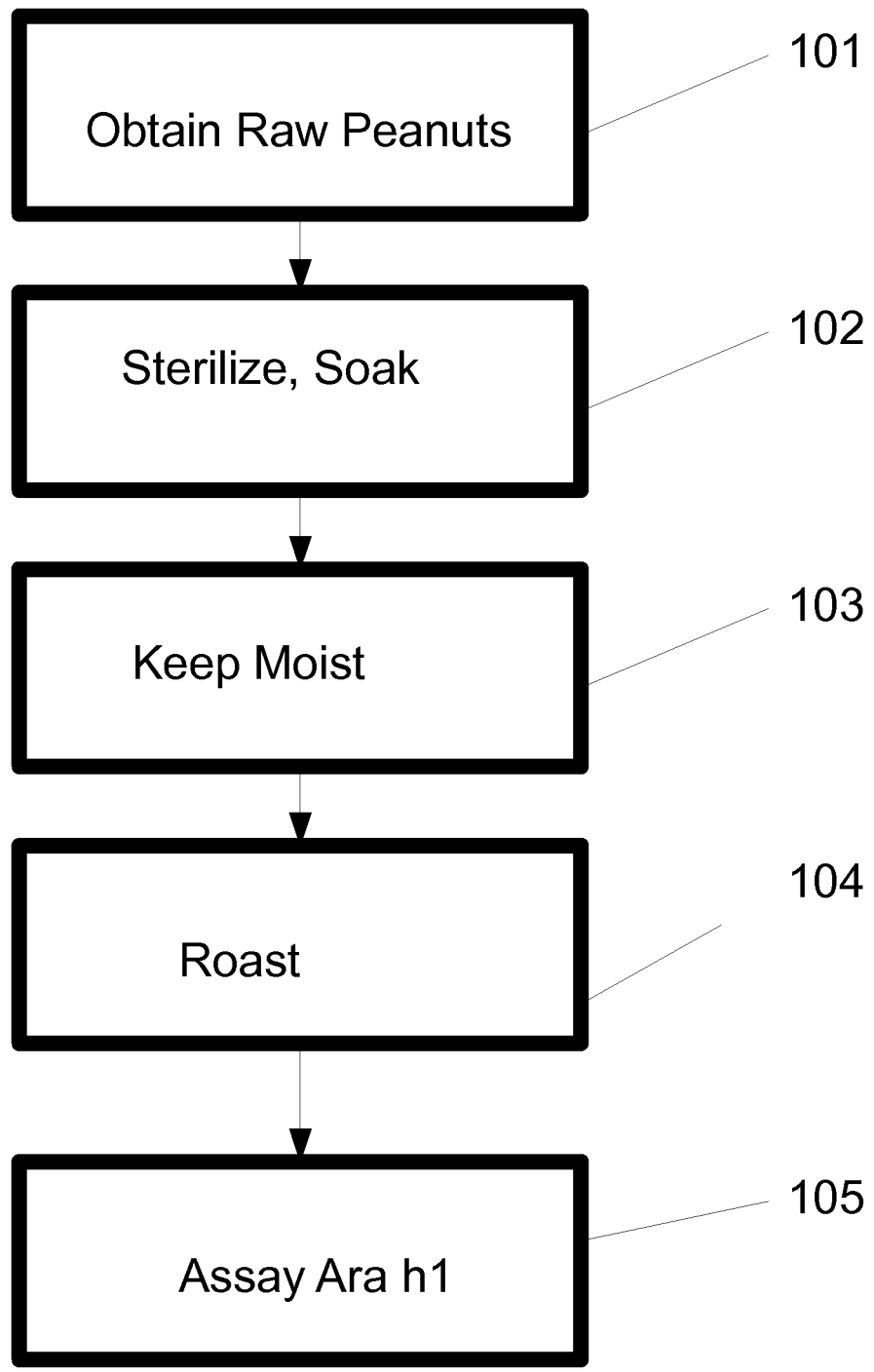

METHOD FOR PRODUCING HYPOALLERGENIC PEANUT PRODUCTS

SUMMARY OF THE INVENTION

A peanut food product with reduced levels of allergenic protein Ara h1 is produced by initiating the germination process in raw peanuts, holding the peanuts in moist conditions for a period of time, typically something like 48 hours, roasting the peanuts, and then performing an assay for Ara h1 to verify that a reduced level has been achieved.

DESCRIPTION OF THE DRAWING

FIG. 1 is a flow chart showing an embodiment of the invention.

DESCRIPTION OF THE INVENTION

Peanuts contain certain proteins which cause allergic reactions in some people. One of these proteins is known as Ara h1. It has been discovered that the amount of Ara h1 in peanuts may be reduced or eliminated by the method disclosed herein. The method comprises two steps. First, raw peanut seeds are put into contact with water and maintained in an environment suitable to cause the germination process and embryo development to be initiated. Then, after about 48 hours, the seeds are gathered and roasted. A suitable time and temperature for this roasting has been found to be 60 minutes in a home-style, non-convection oven at a temperature of 350 F. After the roasting step, the peanuts may then be subjected to an assay for determining the presence of Ara h1 to verify that the resulting product is, indeed, hypoallergenic.

It has been found that both of these steps are required for the hypoallergenic effect to be observed. Peanuts which are roasted without undergoing the germination process retain high levels of Ara h1. Unroasted peanuts which are subjected to germinating conditions even for 48 hours or more also test with high levels of Ara h1. It is only when peanuts are subject to germinating conditions for an effective period of time, and then roasted, that a greatly decreased level of Ara h1 is observed.

The experimental procedure for implementing this invention in the laboratory was as follows. Reference numbers pertain to Drawing FIG. 1:

BRIEF DESCRIPTION OF THE DRAWINGS

FIG. 1 is a flow chart showing exemplary steps of the inventive method.

1. Raw (that is, unroasted) peanuts 101, without shells, but with the brown paper skin intact, were obtained from Whole Foods, a Seattle-area grocery vendor.
2. The nuts were surface sterilized 102 by soaking in a 10% solution of Clorox bleach for 15 minutes.
3. The nuts were then double rinsed with sterile water, and then moistened by soaking in sterile water for 6 hours.
4. A sterile paper towel moistened with sterile water was then placed in a glass tray, the nuts were layered atop the towel, and a similar covering towel was placed on top. The towels and nuts were formed into a roll, enclosed in a layer of plastic films to retain moisture, and kept in sterile conditions at room temperature (22 C) for given lengths of time. This step initiated the germination process of the seeds. A length of time 103 of about 48 hours was found effective.
5. The nuts were then taken from the towel roll and subjected to heat treatment, roasting 104, and then assay 105, so that the results of roasting could be determined.

The foregoing experimental procedure may be varied in numerous ways to accomplish the same results.

Since different strains and varieties of peanuts may have mutations in the gene for Ara h1, various mutant forms of this protein may theoretically exist from variety to variety. That is why it is important to verify the end result of the inventive process with an Ara h1 assay. The exact variety and source of peanuts for input into this inventive process is a results-effective variable ultimately determined by the final Ara h1 assay.

The sterilization steps are not necessarily required to implement the invention, but they are good sanitary practice to prevent spoilage organisms such as mold from forming upon the nuts during germination. Paper towels are not essential, but rather just an example of one means for contacting the nuts with moisture with a view toward initiating and sustaining the seed germination process.

The length of time the germination process should be permitted to continue until the heating step such as roasting is initiated was found to be about 48 hours in the experimental setup, but this could be either a longer or shorter time depending upon process requirements, the individual qualities of the seed stock input, such as seed age, genetics, initial moisture contents, fat content, overall seed quality and health, and other factors. The actual time required for a commercial process is a results-effective variable that is ultimately determined by the results of an Ara h1 assay as a final step in the method. In the experiments conducted, a sandwich ELISA assay was used comprising polyclonal antibodies responsive to Ara h1, HRP enzyme, and TMB as the HRP substrate. It was found that the amount of Ara H1 upon 24 hour soaking/germination process completion was about 50% of that observed in the nuts at hour 0. After 48 hours of soaking/germination, the level of Ara h1 observed was very low, and further decreases were not observed with samples that were subjected to longer periods of germination/soaking.

The result of these processing steps may be used in the normal manner as a food product to be used as any other roasted peanut product, for example as a food topping, material for peanut butter production, etc.

It is believed that allergenic proteins other than Ara h1 will be degraded in a similar manner by the process of germination and roasting described herein.

I claim:

1. A method for producing a hypoallergenic food from peanuts that contains Ara h1 allergen, the method comprising the steps of: a) moistening peanuts containing said allergen with water;

b) holding said peanuts for a time in excess of between 24 and 48 hours under conditions of moisture and temperature effective to initiate and support a germination process, wherein such period of time is verified by an allergen assay to be effective to substantially eliminate said allergen in conjunction with a later roasting step; and c) roasting said peanuts to substantially eliminate said allergen in conjunction with said holding step, as verified by an allergen assay, whereby a hypoallergenic roasted peanut product is produced.

* * * * *